United States Patent
Nakamura et al.

(10) Patent No.: US 6,913,724 B2
(45) Date of Patent: Jul. 5, 2005

(54) SOLVENT CASTING PROCESS AND APPARATUS THEREFOR

(75) Inventors: Toshikazu Nakamura, Kanagawa (JP); Hidekazu Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 338 days.

(21) Appl. No.: 10/260,395

(22) Filed: Oct. 1, 2002

(65) Prior Publication Data

US 2003/0098522 A1 May 29, 2003

(30) Foreign Application Priority Data

Oct. 1, 2001 (JP) ........................................ 2001-305442

(51) Int. Cl.$^7$ ............................................. B29C 39/14
(52) U.S. Cl. ..................... 264/212; 264/217; 264/234
(58) Field of Search ................................ 264/212, 217, 264/234, 211.12, 211.13; 425/223, 404; 26/89

(56) References Cited

U.S. PATENT DOCUMENTS 3,503,134 A * 3/1970 Fleissner ..................... 28/167
3,585,729 A * 6/1971 Fleissner ..................... 34/380
5,152,947 A * 10/1992 Takeda et al. ............... 264/217
2003/0057595 A1 * 3/2003 Tsujimoto .................... 264/217

FOREIGN PATENT DOCUMENTS

JP        2000-191806    *  7/2000

* cited by examiner

Primary Examiner—Mark Eashoo
(74) Attorney, Agent, or Firm—Birch, Stewart, Kolasch & Birch, LLP

(57) ABSTRACT

A process and apparatus for solvent casting which comprises, casting a polymer solution onto a casting support, cooling the polymer solution to gelatinize on the casting support to form web, stripping off the web from the casting support, thrusting side edges of the web into pins of a pin tenter by an inserting device, and drying the web while conveying the web with carrying the side edges of the web by the pin tenter, wherein the inserting device is cooled so that the surface temperature of the web in contact with the inserting device does not exceed a gelation temperature of the polymer solution are proposed. The present invention makes surely to convey the web without slipping from the pin tenters even when the pin tenters convey the web at a high speed. As a result, the productivity of film can be improved.

5 Claims, 2 Drawing Sheets

SOLVENT CASTING PROCESS AND APPARATUS THEREFOR

FIELD OF THE INVENTION

The present invention relates to a process and apparatus for solvent casting capable of conveying a web without slipping off from pin tenters.

BACKGROUND OF THE INVENTION

Generally, solvent casting produces a part of films, such as cellulose acetate, polycarbonate and cellophane. In the solvent casting process, dope which is a polymer solution is cast from a casting die onto a casting support of belt type or drum type, stripped off after being dehumidified to some extent on the casting support, dried while being carried by a tenter machine with being held at both side edges, and further dried while being conveyed over rollers. (JP 62-46625A, JP 62-46626A, etc.).

The tenter machine includes a pin tenter and a clip tenter, and the pin tenter has a function of inserting the side edges of the web into the pins of itself by thrusting the edge of the web downward by an inserting device, such as an engaging brush. However, in conveyance of the web by a conventional pin tenter machine, the web once inserted in the pin tenters often slips off from the pin tenter thereby losing the state of being conveyed. When the speed of the conveyance increases, this phenomenon particularly becomes conspicuous and disturbs an improvement in the productivity of film forming.

SUMARRY OF THE INVENTION

An object of the invention is to solve the foregoing problems and, to provide a process and apparatus for solvent casting that is able to favorably convey a film web without slipping off from a pin tenter machine even in the case of increasing the speed of conveyance of the web.

By investing eagerly the phenomenon that the web slips off from the pin tenter, it was found that, when the temperature of an engaging brush is high upon inserting the web into pins of the pin tenter, the gelatinized web returns to the state of sol and adheres to the engaging brush which causing the slipping off. Increasing the speed of conveyance of the web elevates a gelation temperature due to the increase of residual volatile components in the web, thereby induces that the web easily adheres to the pin tenter.

Based on the foregoing finding, the present invention provides to restrain the web from increasing of the temperature by cooling an inserting device, such as an engaging brush.

A process for solvent casting of the invention comprises casting a polymer solution onto a casting support, cooling the polymer solution to gelatinize on the casting support to form web, stripping off the web from the casting support, thrusting side edges of the web into pins of a pin tenter by an inserting device, and drying the web while conveying the web with carrying the side edges of the web by the pin tenter, wherein the inserting device is cooled so that the surface temperature of the web in contact with the inserting device does not exceed a gelation temperature of the polymer solution.

According to the process for solvent casting of the invention, the web is prevented from adhering to the inserting device by restraining the web from the temperature rise over the gelation temperature because of its contact with the inserting device being cooled.

An apparatus for solvent casting of the invention comprises, a casting means for casting a dope of a polymer solution onto a casting support to form web, a stripping means for stripping off the web from the support, an inserting device for thrusting side edges of the web into pins of a pin tenter, and a drying means for drying the web stripped off while conveying the web with carrying the side edges of the web by the pin tenter, wherein said inserting device is provided with a cooling means.

According to the solvent casting apparatus of the invention, the web is prevented from adhering to the inserting device by restraining the web from the temperature rise over the gelation temperature because of its contact with the inserting device being cooled.

DETAILED DESCRIPTION OF THE INVENTION

Figure 1:
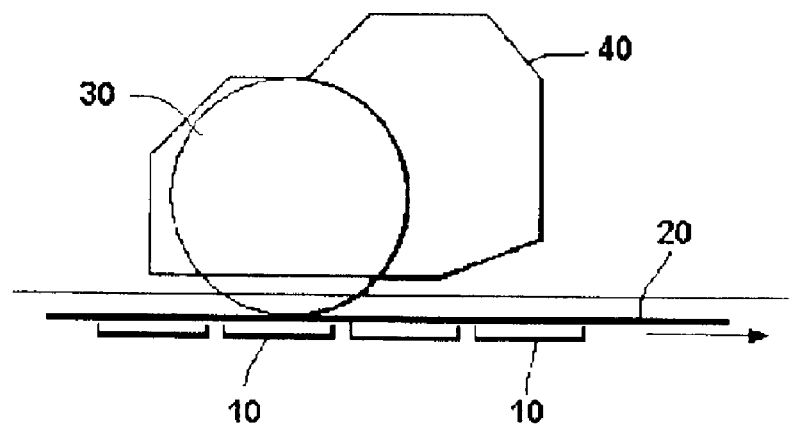
FIG. 1 is a schematic side elevation of a tenter drying section of a solvent casting apparatus which embodies the invention.

In a process for solvent casting of the invention, the surface temperature of the web is prevented by cooling of the inserting device from elevating over the gelation temperature of the web while being in contact with the inserting device, i.e. from touching of the inserting device to the web to departing therefrom. The cooling means for cooling the inserting device is not particularly limited. The cooling may be conducted either by introducing cooling air into a covered inserting device using a cooling air supply or by directly cooling the inserting device.

The surface temperature of the web is rendered so as not to exceed the gelation temperature of the web by cooling, and the surface temperature is preferred to be lower than the gelation temperature by 2° C. or more, particularly preferably lower than the gelation temperature by 3° C. or more. Regarding the temperature of the cooling air, although it may be appropriately set according to the inserting device, etc., it is preferable to be from −40° C. to 0° C., more preferably from −30° C. to −10° C.

When the cooling air is employed as the cooling means, it is desirable to remove foreign matters around the web. That is, dust generates by inserting the web into the pins of a pin tenter, and often scattered around the web by blowing the cooling air. The scattered dust adheres to the web to render the web unsuitable as a product, and thereby, an yield of the product becomes worse. Accordingly, by providing a suction removal means for removing foreign matters such as the dust generated by inserting the web into the pins of a pin tenter, the surface of the web can be kept clean by the removal of the foreign matters, and as a result, a reduction of the yield can be prevented.

Therefore, when sucking foreign matters around the web, cooling air supply and suction simultaneously occur at the place of inserting web into a pin tenter by the inserting device. It is preferable that a static pressure at this place is from −100 to 100 Pa, desirably from −70 to 70 Pa and more desirably from −50 to 50 Pa as compared with atmospheric pressure outside the cover. When the static pressure is less than −100 Pa, cooling efficiency degrades caused by sucking high temperature drying wind in the tenter machine. As a result, the surface temperature of the web is unable to be lowered enough. When the static pressure exceeds 100 Pa, the yield of product degrades by scattering foreign matters such as dust.

The inserting device has any structure capable of inserting web into pins of a pin tenter. An example of the inserting device is a rotor on the periphery of which brush is planted.

The polymer solutions applicable to the process for solvent casting of the invention are solutions of cellulose ester, polycarbonate, aramid group polymers, norbornen group polymers, etc. Preferable cellulose esters are lower fatty acid esters of cellulose. The lower fatty acid means a fatty acid having 6 carbon atoms or less. A preferable number of carbon atoms is 2 (cellulose acetate), 3 (cellulose propionate) or 4 (cellulose butylate). Among these, cellulose acetate is particularly preferable. A mixture of fatty acid esters may be used, such as cellulose acetate propionate or cellulose acetate butylate.

The film produced by the process for solvent casting of the invention can be applied to protection film for polarizing plate, optically functional films (optical compensation sheet, antireflection film, brightness improvement membrane), etc.

Preferred embodiments of the process for solvent casting according to the invention will hereinafter be described with reference to the attached drawings.

Figure 2:
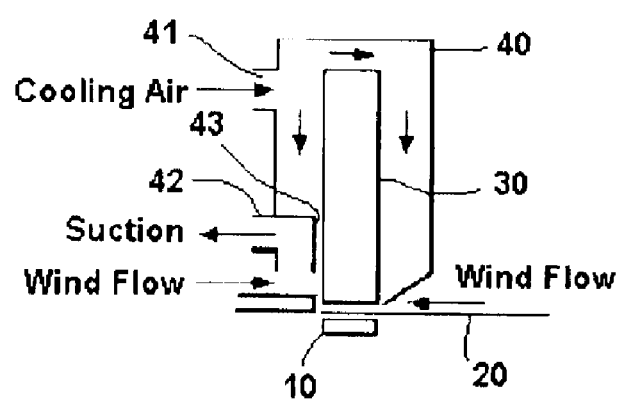
FIG. 2 is a schematic illustration looking at the tenter drying section of the solvent casting apparatus from a conveying direction of the web which embodies the invention.
Figure 3:
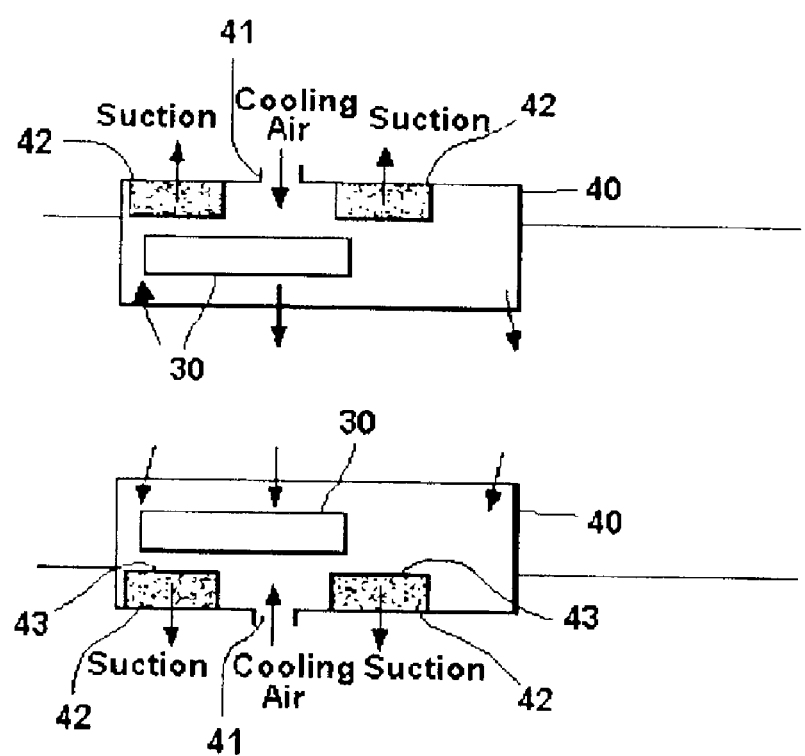
FIG. 3 is a schematic plan view of the tenter drying section of the solvent casting apparatus which embodies the invention.

FIG. 1 is a schematic side elevational view of a tenter drying section of the solvent casting apparatus carrying out the process for solvent casting of the invention. FIG. 2 is a schematic illustration looking at the tenter drying section of the solvent casting forming apparatus, and FIG. 3 is a schematic plan view of the tenter drying section.

In FIG. 1, reference numeral 10 indicates a pin tenter which is freely travelable in the right direction in the drawing, and web 20 is conveyed with carrying on the upper part of the pin tenters 10. Reference numeral 30 indicates an engaging brush provided revolvably as the inserting device, and by a depressing the web 20 by the lower end of the engaging brush 30, the web 20 is inserted into pins of the pin tenter 10.

The engaging brush 30 is placed in a box type brush cover 40 of which the bottom is opened, so as to shield it from drying wind. On the upper parts of the brush cover 40 at almost the center in the conveying direction, cooling air introduction inlet 41 is provided and from which, the cooling air is introduced into the brush cover 40.

A cooling air introduction means (not shown) are coupled with the cooling air introduction inlet 41 through an air duct (not shown). The brush cover 40 and the cooling air introduction means compose the cooling means for cooling the engaging brush 30. Furthermore, two exhaust outlets 42 are provided in the conveying direction on the outer wall of the brush cover 40, and on the inside of the exhaust outlets 42, a guide plate 43 which extends to the neighborhood of the upper surface of web 20 are provided.

On the outside of the exhaust outlets 42, a suction means (not shown) is coupled with them through an air duct (not shown).

In accordance with the foregoing construction of the tenter drying section, the pin tenters convey the web 20 in such a way that the web 20 traveling from the casting section is depressed with the engaging brushes 30 which are revolving to be inserted into pins of the pin tenters 10 thereby being carried by pin tenters 10. Then, the web 20 is dried while being conveyed in the state of being carried by the pin tenters 10.

Meanwhile, the cooling air is introduced into the brush covers 40 through cooling air introduction inlets 41 from a cooling air supply means. Introduced cooling air is sent from the upper part to the lower part inside the brush covers 40, and, in this stage, it cools the engaging brushes 30. Accordingly, although the web 20 contacts with the engaging brushes 30 on being depressed by them, the web 20 is not heated by them and the surface temperature of the web does not rise higher than it's gelation temperature.

Furthermore, the air on the web 20 is sucked by the suction means through exhaust outlets 42. By the suction, dust generating during inserting the web 20 into the pins of pin tenters 10, etc., are exhausted outside brush covers 40. Therefore, a good quality of the web can be maintained because the dust does not adhere onto the web 20.

In the brush covers 40, cooling air is introduced and simultaneously exhausted by the suction, and a static pressure in the area where the web 20 is inserted into the pins by the engaging brushes 30 is settled from −100 Pa to 100 Pa as compared with an atmospheric pressure outside the brush covers 40. That is, an effective cooling is assured within the foregoing range by adjusting the amounts of cooling air and exhaust air by suction.

EXAMPLES

A cellulose triacetate film was produced with a solvent casting apparatus having a tenter drying section shown in FIG. 1. Recipe of the dope employed is shown as follows:

| Triacetate: | 200 mass parts |
|---|---|
| Plasticizer: | 24 mass parts |
| Dichloromethane: | 650 mass parts |
| Methanol: | 112 mass parts |
| Butanol: | 12 mass parts |
| Ultraviolet absorber: | 2 mass parts |

As the plasticizer, triphenylphosphate and biphenyldiphenylphosphate were employed, and as the UV absorber, 2 (2'-hydroxy-3', 5'-di-tert-amylphenyl)-5-benzotriazole (1.3 mass %), 2 (2'-hydroxy-3',5'-di-tert-butylphenyl)-5-chloro benzotriazole (0.7 mass %) were employed.

Using the foregoing dope, experimentation was carried out with changing the surface temperature of the web and the static pressure inside the brush covers. Results are shown Table 1.

TABLE 1

| | Cooling Air Temp. (° C.) | Brush Cover Peripheral Temp. (° C.) | Cooling Air Amount (m³/min) | Suction Exhaust Amount (m³/min) | Static Pressure Inside Brush Cover (Pa) | Web Surface Temp (° C.) | Web Gelation Temp. (° C.) | Adhesion Between Web and Brush | Scatter of Foreign Matters |
|---|---|---|---|---|---|---|---|---|---|
| Ex.1 | −17 | 60 | 5 | 9 | −100 | 6.7 | 6.7 | Slightly | None for 6 months |
| Ex.2 | −17 | 60 | 5 | 8 | −70 | 4.7 | 6.7 | Weakly | None for 6 months |
| Ex.3 | −17 | 60 | 5 | 7 | −50 | 3.7 | 6.7 | None | None for 6 months |
| Ex.4 | −17 | 60 | 5 | 3 | 50 | 1 | 6.7 | None | None for 6 months |
| Ex.5 | −17 | 60 | 5 | 2 | 70 | 0 | 6.7 | None | Yield degraded after 3 months |
| Ex.6 | −17 | 60 | 5 | 1 | 100 | −1 | 6.7 | None | Yield degraded after 1 month |
| Ex.7 | −17 | 60 | 5 | 0.7 | 120 | −3 | 6.7 | None | Yield degraded after 1 week |
| Comp. Ex.1 | −17 | 60 | 5 | 12 | −120 | 8 | 6.7 | Failed to engage | — |

In Table 1, "Ex.", "Comp." and "Temp." are abbreviations of "Example", "Comparative" and "Temperature" respectively.

According to the present invention, web can be conveyed surely without slipping from pin tenters even when the pin tenters convey the web at a high speed. As a result, the productivity of film can be improved.

What is claimed is:

1. A process for solvent casting which comprises, casting a polymer solution onto a casting support, cooling the polymer solution to gelatinize on the casting support to form web, stripping off the web from the casting support, thrusting side edges of the web into pins of a pin tenter by an inserting device, and drying the web while conveying the web with carrying the side edges of the web by the pin tenter, wherein the inserting device is cooled so that the surface temperature of the web in contact with the inserting device does not exceed a gelation temperature of the polymer solution.

2. The process for solvent casting according to claim 1, wherein said inserting device is covered by a cover and said cooled is by introducing cooling air into the cover.

3. The process for solvent casting according to claim 2, wherein said cover is provided with a suction means.

4. The process for solvent casting according to claim 2, wherein area of thrusting the side edges of the web by the inserting device has a static pressure of −100 Pa to 100 Pa as compared with atmospheric pressure outside said cover.

5. The process for solvent casting according to claim 1, wherein said polymer is cellulose triacetate.

* * * * *